United States Patent
Huang et al.

(10) Patent No.: US 10,389,249 B2
(45) Date of Patent: Aug. 20, 2019

(54) SWITCHING REGULATOR HAVING ADJUSTABLE INDUCTOR CURRENT THRESHOLD AND CONTROL METHOD THEREOF

(71) Applicant: RICHTEK TECHNOLOGY CORPORATION, Zhubei, Hsinchu (TW)

(72) Inventors: Hong-Wei Huang, Zhubei (TW); Yu-Kai Lin, Zhubei (TW); Wei-Chuan Wu, Changhua (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/009,374

(22) Filed: Jun. 15, 2018

(65) Prior Publication Data
US 2019/0006946 A1    Jan. 3, 2019

Related U.S. Application Data

(60) Provisional application No. 62/526,460, filed on Jun. 29, 2017.

(30) Foreign Application Priority Data

Feb. 13, 2018 (CN) ............ 2018 1 0149777

(51) Int. Cl.
*H02M 3/158*    (2006.01)
*H02M 1/08*    (2006.01)
*H02M 1/00*    (2006.01)
*H02M 1/088*    (2006.01)

(52) U.S. Cl.
CPC ........... *H02M 3/158* (2013.01); *H02M 1/088* (2013.01); *H02M 2001/0025* (2013.01)

(58) Field of Classification Search
CPC ........ H02M 3/158; H02M 3/156; H02M 1/08; H02M 1/088; H02M 2001/0025; H02M 2001/0009; H02M 2001/0032; H02M 3/155

See application file for complete search history.

(56) References Cited

U.S. PATENT DOCUMENTS 9,729,057 B1 *   8/2017   Goenawan ............ H02M 3/156
2005/0206358 A1 *   9/2005   Van Der Horn ...... H02M 3/156
                                                                          323/282

(Continued)

*Primary Examiner* — Gustavo A Rosario-Benitez
(74) *Attorney, Agent, or Firm* — Tung & Associates

(57) ABSTRACT

A switching regulator having adjustable inductor current threshold employs a control method which includes: (S1) determining whether an output voltage is greater than a reference voltage or determining whether a switching frequency of the power stage is smaller than a predetermined lower frequency limit, and (S2) when it is determined yes in the step (S1), adjusting the inductor current threshold, such that the switching regulator operates under a pseudo discontinuous conduction mode (PDCM) wherein the switching frequency is not smaller than the predetermined lower frequency limit. Consequently, when the switching regulator operates under a light load mode, an optimum balance between a total power consumption and switching noise interference will be ensured.

25 Claims, 11 Drawing Sheets

(56) References Cited

U.S. PATENT DOCUMENTS

| | | | | |
|---|---|---|---|---|
| 2007/0236971 A1* | 10/2007 | Chen | ............... | H02M 3/1588 |
| | | | | 363/56.01 |
| 2010/0320975 A1* | 12/2010 | Boling | ............... | H02M 3/156 |
| | | | | 323/267 |
| 2013/0077370 A1* | 3/2013 | Gu | ............... | H02M 1/4225 |
| | | | | 363/126 |
| 2014/0177300 A1* | 6/2014 | Lagorce | ............... | H02M 7/4826 |
| | | | | 363/71 |
| 2014/0239830 A1* | 8/2014 | Kiyota | ............... | H05B 33/0815 |
| | | | | 315/200 R |
| 2014/0266122 A1* | 9/2014 | Zhu | ............... | H02M 3/156 |
| | | | | 323/284 |
| 2015/0349630 A1* | 12/2015 | Peng | ............... | H02M 3/156 |
| | | | | 323/282 |
| 2018/0019671 A1* | 1/2018 | Li | ............... | H02M 1/083 |
| 2018/0091041 A1* | 3/2018 | Feng | ............... | H02M 1/4258 |
| 2018/0191249 A1* | 7/2018 | Su | ............... | H02M 3/1588 |

* cited by examiner

Inductor current threshold Izc is adjustable

Corresponding to LC3

Corresponding to LC4

SWITCHING REGULATOR HAVING ADJUSTABLE INDUCTOR CURRENT THRESHOLD AND CONTROL METHOD THEREOF

CROSS REFERENCE

The present invention claims priority to U.S. 62/526460 filed on Jun. 29, 2017, and CN 201810149777.2, filed on Feb. 13, 2018.

BACKGROUND OF THE INVENTION

Field of Invention

The present invention relates to a switching regulator having adjustable inductor current threshold and a control method thereof; particularly, it relates to such switching regulator having adjustable inductor current threshold and such control method capable of adjusting the inductor current threshold of the power stage, so that when the switching regulator operates under a light load mode or even an ultra-light load mode, an optimum balance between total power consumption and switching noise interference is achieved.

Description of Related Art

To supply power to a load, a conventional switching regulator may operate either under a discontinuous conduction mode (DCM) or a continuous conduction mode (CCM).

However, when the conventional switching regulator operates under CCM and under a light load mode, there will be a reverse inductor current (i.e., the sign of the level of the inductor current will be negative), whereby the efficiency of the conventional switching regulator is lowered (as shown by the curve labeled as "prior art 1 (CCM)" in FIG. 4).

On the other hand, when the conventional switching regulator operates under DCM and under a light mode, because the DCM operation has a zero current detection mechanism, when the inductor current flowing through the inductor drops to zero, the lower gate transistor switch will be turned OFF immediately, such that there will be no reverse inductor current (as shown by the curve labeled as "prior art 2 (DCM)" in FIG. 4). Nevertheless, such "prior art 2 (DCM)" still has a drawback, which is: when the conventional switching regulator operates under DCM and under an ultra-light load mode, the switching frequency of the conventional switching regulator will gradually decrease, resulting in undesirable noise interference.

Therefore, either the conventional switching regulator operates under DCM or CCM, there is a dilemma of either occurrence of an undesirable noise interference or low power efficiency under a light load mode. Because the switching regulator in many communication systems nowadays (for example, a smart phone) is often required to operate under a light load mode, it is vital for the switching regulator, especially under a light load mode, to ensure an optimum balance between power switching efficiency and switching noise interference.

In view of the above, to overcome the drawbacks in the prior art, the present invention propose a switching regulator having adjustable inductor current threshold and a control method capable of adjusting the inductor current threshold of the power stage, so that when the switching regulator operates under a light load mode or even an ultra-light load mode, an optimum balance between power switching efficiency and switching noise interference is achieved.

SUMMARY OF THE INVENTION

From one perspective, the present invention provides a control method of a switching regulator which has an adjustable inductor current threshold, wherein the switching regulator is configured to operably convert an input power to an output power and supply the output power to an external load, the switching regulator comprising a pulse width modulation (PWM) controller and a power stage, the power stage including: an inductor, a first power transistor and a second power transistor, which are coupled to one another, the PWM controller being configured to operably control the first power transistor and the second power transistor to convert the input power to the output power, wherein when an inductor current reaches an inductor current threshold, the PWM controller turns OFF the first power transistor and the second power transistor, the control method of the switching regulator having the adjustable inductor current threshold comprising the steps of: (S1) determining whether an output voltage is greater than a reference voltage or determining whether a switching frequency of the power stage is smaller than a predetermined lower frequency limit; and (S2) when it is determined yes in the step (S1), adjusting the inductor current threshold, such that the switching regulator operates under a pseudo discontinuous conduction mode (PDCM) wherein the switching frequency is not smaller than the predetermined lower frequency limit.

In one embodiment, the step (S2) further includes: lowering down the inductor current threshold to be smaller than zero.

In one embodiment, the control method further comprises: (S3) when it is determined no in the step (S1), raising up the inductor current threshold.

In one embodiment, the inductor current threshold is raised up at most to zero.

In one embodiment, the step of raising up the inductor current threshold includes: raising up the inductor current threshold step-wisely by a predetermined difference value; and wherein the step of lowering down the inductor current threshold includes: lowering down the inductor current threshold step-wisely by the predetermined difference value.

In one embodiment, through adjusting the inductor current threshold in the step (S2) and/or the step (S3), the switching frequency of the power stage is maintained at a constant frequency.

In one embodiment, before the first power transistor and the second power transistor are turned OFF, the first power transistor or the second power transistor whichever is able to cause the inductor current to be raised up is ON until the inductor current is raised up to zero, and then the first power transistor and the second power transistor are turned OFF.

From another perspective, the present invention provides a switching regulator which has an adjustable inductor current threshold, wherein the switching regulator is configured to operably convert an input power to an output power and supply the output power to an external load; the switching regulator comprising: a power stage including an inductor, a first power transistor and a second power transistor, which are coupled to one another; and a pulse width modulation (PWM) controller, which is configured to operably control the first power transistor and the second power transistor to convert the input power to the output power;

wherein, when an inductor current reaches an inductor current threshold, the PWM controller turns OFF the first power transistor and the second power transistor; wherein, the PWM controller includes: a driver circuit, which is configured to operably control the first power transistor and the second power transistor according to a PWM signal; and an operation circuit, which is configured to operably generate the PWM signal, wherein the operation circuit is configured to determine whether an output voltage is greater than a reference voltage or determining whether a switching frequency of the power stage is smaller than a predetermined lower frequency limit; when the output voltage is greater than the reference voltage or when the switching frequency of the power stage is smaller than the predetermined lower frequency limit, the operation circuit adjusts the inductor current threshold such that the switching regulator operates under a pseudo discontinuous conduction mode (PDCM) wherein the switching frequency is not smaller than the predetermined lower frequency limit.

In one embodiment, when the output voltage is greater than the reference voltage or when the switching frequency of the power stage is smaller than the predetermined lower frequency limit, the operation circuit lowers the inductor current threshold to be smaller than zero.

In one embodiment, when the output voltage is not greater than the reference voltage and the switching frequency of the power stage is not smaller than the predetermined lower frequency limit, the operation circuit raises up the inductor current threshold.

In one embodiment, the inductor current threshold is raised up at most to zero.

In one embodiment, the operation circuit raises up or lowers the inductor current threshold step-wisely by a pre-determined difference value.

In one embodiment, the switching frequency of the power stage is maintained at a constant frequency.

In one embodiment, before the first power transistor and the second power transistor are turned OFF, the first power transistor or the second power transistor whichever is able to cause the inductor current to be raised up is ON until the inductor current is raised up to zero, and then the first power transistor and the second power transistor are turned OFF.

In one embodiment, the operation circuit includes: an amplifier circuit, which is configured to operably generate a base level signal according to a difference between the output voltage and the reference voltage, wherein the base level signal corresponds to the inductor current threshold; and a comparison circuit, which is configured to operably compare the base level signal with a signal related to the inductor current, to generate a pseudo zero current signal, wherein pseudo zero current signal indicates whether the inductor current has reached the inductor current threshold.

In one embodiment, the operation circuit further includes a unidirectional conductive circuit for controlling a current direction of an output terminal of the amplifier circuit to limit the base level signal, such that the inductor current threshold is at most zero.

From yet another perspective, the present invention provides a PWM controller, which is configured to operably control a switching regulator, wherein the switching regulator is configured to operably convert an input power to an output power and supply the output power to an external load; the switching regulator comprising: a power stage including an inductor, a first power transistor and a second power transistor, which are coupled to one another, wherein the PWM controller controls the first power transistor and the second power transistor to convert the input power to the output power; wherein when an inductor current reaches an inductor current threshold, the PWM controller turns OFF the first power transistor and the second power transistor; the PWM controller comprising: a driver circuit, which is configured to operably control the first power transistor and the second power transistor according to a PWM signal; and an operation circuit, which is configured to operably generate the PWM signal, wherein the operation circuit is configured to determine whether an output voltage is greater than a reference voltage or determining whether a switching frequency of the power stage is smaller than a predetermined lower frequency limit; when the output voltage is greater than the reference voltage or when the switching frequency of the power stage is smaller than the predetermined lower frequency limit, the operation circuit adjusts the inductor current threshold such that the switching regulator operates under a pseudo discontinuous conduction mode (PDCM) wherein the switching frequency is not smaller than the predetermined lower frequency limit.

In one embodiment, when the output voltage is greater than the reference voltage or when the switching frequency of the power stage is smaller than the predetermined lower frequency limit, the operation circuit lowers the inductor current threshold to be smaller than zero.

In one embodiment, when the output voltage is not greater than the reference voltage and the switching frequency of the power stage is not smaller than the predetermined lower frequency limit, the operation circuit raises up the inductor current threshold.

In one embodiment, the inductor current threshold is raised up at most to zero.

In one embodiment, the operation circuit raises up or lowers the inductor current threshold step-wisely by a pre-determined difference value.

In one embodiment, the switching frequency of the power stage is maintained at a constant frequency.

In one embodiment, before the first power transistor and the second power transistor are turned OFF, the first power transistor or the second power transistor whichever is able to cause the inductor current to be raised up is ON until the inductor current is raised up to zero, and then the first power transistor and the second power transistor are turned OFF.

In one embodiment, the operation circuit includes: an amplifier circuit, which is configured to operably generate a base level signal according to a difference between the output voltage and the reference voltage, wherein the base level signal corresponds to the inductor current threshold; and a comparison circuit, which is configured to operably compare the base level signal with a signal related to the inductor current, to generate a pseudo zero current signal, wherein pseudo zero current signal indicates whether the inductor current has reached the inductor current threshold.

In one embodiment, the operation circuit further includes a unidirectional conductive circuit for controlling a current direction of an output terminal of the amplifier circuit to limit the base level signal, such that the inductor current threshold is at most zero.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings.

The drawings as referred to throughout the description of the present invention are for illustration only, to show the interrelations between the connection of circuits and waveforms of corresponding signals, but not drawn according to actual scale of each circuit, signal waveform and frequency.

Figure 1:
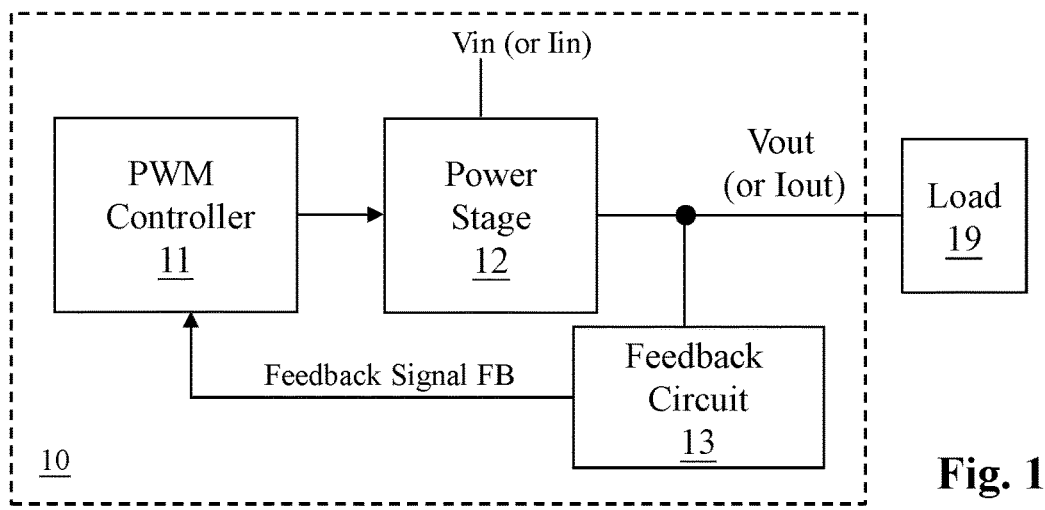
FIG. 1 shows a schematic block diagram of a switching regulator having an adjustable inductor current threshold according to an embodiment of the present invention.

Please refer to FIG. 1, which shows a schematic block diagram of a switching regulator having an adjustable inductor current threshold according to an embodiment of the present invention.

Figure 2A:
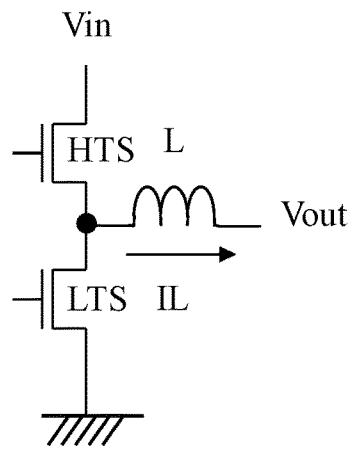
FIGS. 2A-2C show synchronous buck, boost and buck-boost power stage circuits, respectively.
Figure 2B:
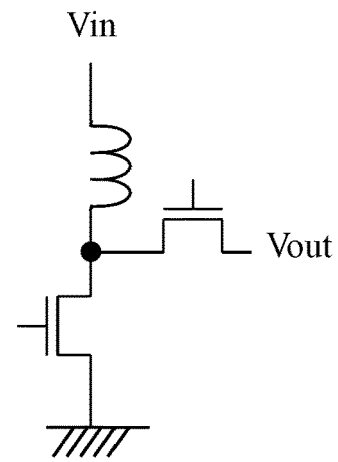
Figure 2C:
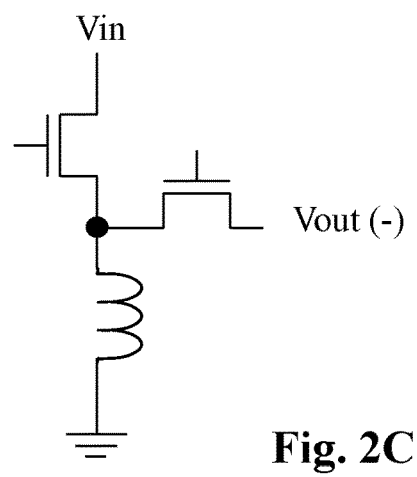

In this embodiment, the switching regulator having an adjustable inductor current threshold (switching regulator 10) comprises: a power stage 12, a feedback circuit 13 and a pulse width modulation (PWM) controller 11. The power stage 12 includes an inductor, a first power transistor and a second power transistor, which are coupled to one another. The power stage 12 is configured to operably control the first power transistor and the second power transistor to convert the input power to the output power according to a PWM signal, wherein the inductor, the first power transistor and the second power transistor operate to perform a synchronous switching power conversion. In one embodiment, the input power includes an input voltage Vin and an input current Iin. In one embodiment, the output power includes an output voltage Vout and an output current Iout. The PWM controller 11 controls the power stage 12 to switch the first power transistor and the second power transistor, so as to convert the input power to the output power. The power stage 12 can be, for example but not limited to, a synchronous buck, boost or buck-boost power stage circuit, as shown in FIGS. 2A-2C.

Please still refer to FIG. 1. The feedback circuit 13 generates a feedback signal FB which is related to the output voltage Vout and inputs the feedback signal FB into the PWM controller 11, so that the PWM controller 11 can control the power stage 12 to adjust the output power (one or both of the output voltage Vout and output current Iout) to a desired level. In one embodiment, the switching regulator 10 is coupled to a load 19 and the switching regulator can supply the output power to the load 19. In one embodiment, the load 19 can be, for example but not limited to, a battery.

Figure 4:
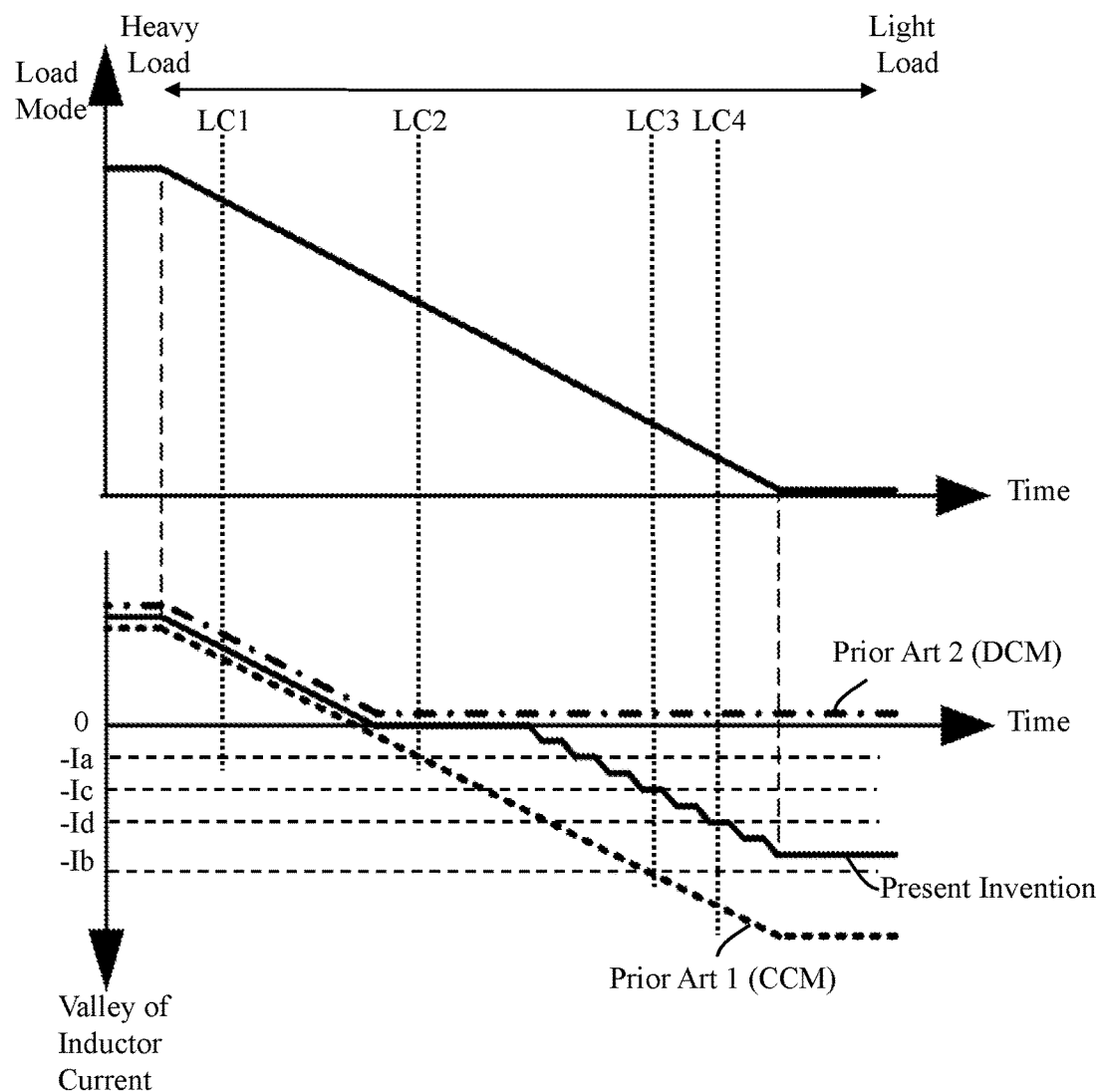
FIG. 4 shows a comparison between the present invention and the prior art.
Figure 6A:
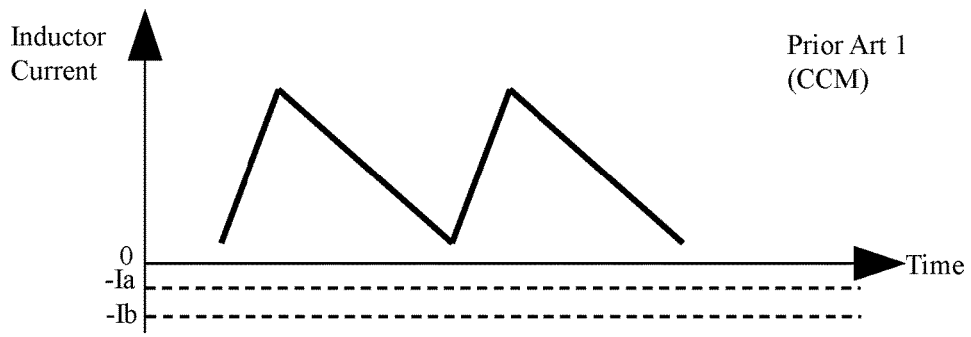
FIG. 6A shows, under a continuous conduction mode (CCM) operation, a wave form of the inductor current of prior art when the prior art is under a heavy load condition (corresponding to the load mode LC1 shown in FIG. 4).
Figure 6B:
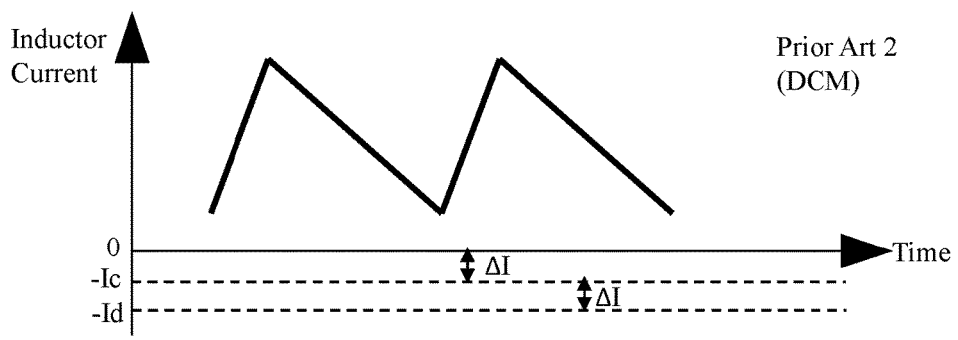
FIG. 6B shows, under a discontinuous conduction mode (DCM) operation, a wave form of the inductor current of prior art when the prior art is under a heavy load condition (corresponding to the load mode LC1 shown in FIG. 4).
Figure 6C:
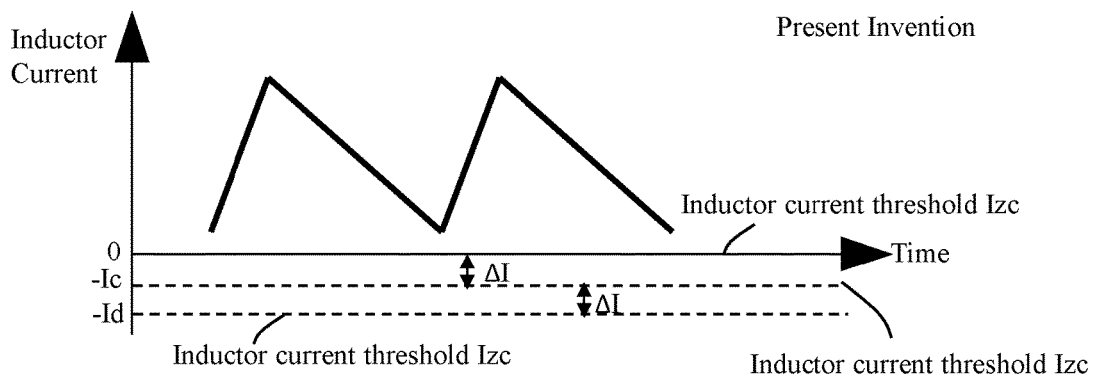
FIG. 6C shows, under a heavy load condition (corresponding to the load mode LC1 shown in FIG. 4), a wave form of the inductor current of the present invention.

Please refer to FIG. 4 in conjugation with FIGS. 6A-6C. FIG. 4 shows a comparison between the present invention and the prior art.

As shown in FIG. 4, the load 19 may operate under a heavy load mode (as shown by the dashed line LC1 in FIG. 4), or under a light load mode (as shown by the dashed lines LC2, LC3 or LC4 in FIG. 4). Specifically, the load mode shown by the dashed line LC4 in FIG. 4 is an ultra-light load mode.

FIGS. 6A-6C show wave forms of the inductor current, in correspondence to the load mode LC1 shown in FIG. 4. That is, FIGS. 6A-6C show wave forms of the inductor current when the load 19 is operating under a heavy load mode. FIG. 6A shows, under a continuous conduction mode (CCM) operation, a wave form of the inductor current of prior art when the prior art is under a heavy load mode (corresponding to the load mode LC1 shown in FIG. 4). FIG. 6B shows, under a discontinuous conduction mode (DCM) operation, a wave form of the inductor current of prior art when the prior art is under a heavy load mode (corresponding to the load mode LC1 shown in FIG. 4). FIG. 6C shows, under a heavy load mode (corresponding to the load mode LC1 shown in FIG. 4), a wave form of the inductor current of the present invention.

A comparison of the wave forms of FIGS. 6A-6C shows that: when the conventional switching regulator operates under CCM and under a heavy load mode, the valley of the waveform of the inductor current IL will never be zero but always be greater than zero, as shown in FIG. 6A.

Besides, although it is intended for the conventional switching regulator to operate under DCM, under a heavy load mode, the valley of the waveform of the inductor current IL will never be zero but always be greater than zero, as shown in FIG. 6B (so, in fact, the conventional switching regulator does not enter DCM under a heavy load mode).

And, when the switching regulator 10 according to an embodiment of the present invention operates under a heavy load mode, the valley of the waveform of the inductor current IL will never be zero but always be greater than zero, as shown in FIG. 6C.

In brief, according to the wave forms of FIGS. 6A-6C, it is found that: in either the conventional switching regulator or the switching regulator 10 of the present invention, as long as the switching regulator operates under a heavy load mode, there will be no difference between the total power consumption and the switching frequency.

However, when the conventional switching regulator operates under alight load mode (as shown by the dashed lines LC2, LC3 or LC4 in FIG. 4), the efficiency and the switching frequency of the conventional switching regulator will behave differently depending on which specific light load mode where the conventional switching regulator operates under.

For example, when the conventional switching regulator operates under CCM and under a light load mode (as shown by the dashed lines LC2, LC3 or LC4 in FIG. 4), because the inductor current can be negative (reverse direction) without lower limit, an unwanted power loss (conduction loss due to negative current) is expected (please refer to the curve labeled as "prior art 1 (CCM)" in FIG. 4).

Please refer to the synchronous buck power stage circuit as shown in FIG. 2A. The following description will take the synchronous buck power stage circuit of FIG. 2A as an example.

When the conventional switching regulator operates under DCM and under a light load mode (as shown by the dashed lines LC2, LC3 or LC4 in FIG. 4), the lower gate transistor switch LTS will be turned OFF when the inductor current IL flowing through the inductor L reduces to zero. Under such circumstance, because there will be no negative current, the overall power switching efficiency will be improved. However, when the load current is low (for example, the load mode LC3 or LC4), because the conventional switching regulator operates under DCM, the frequency will decrease, whereby the switching noise interference occurs (please refer to the curve labeled as "prior art 2 (DCM)" in FIG. 4).

In view of the above, to overcome the drawbacks in the prior art, the present invention propose a switching regulator 10 capable of adjusting the inductor current threshold Izc of the power stage 12, so that when the switching regulator 10 operates under a light load mode (as shown by the load mode LC2 in FIG. 4) or even an ultra-light load mode (as shown by the load mode LC3 or LC4 in FIG. 4), the overall power switching efficiency will be optimized. In addition, the switching frequency does change and thus there will be no noise interference.

Figure 5A:
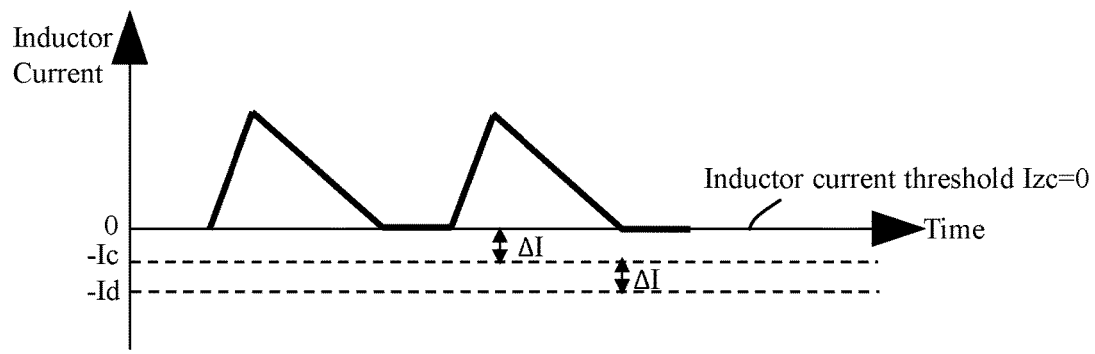
FIG. 5A-5C show that the inductor current threshold of the present invention is adjustable.
Figure 5B:
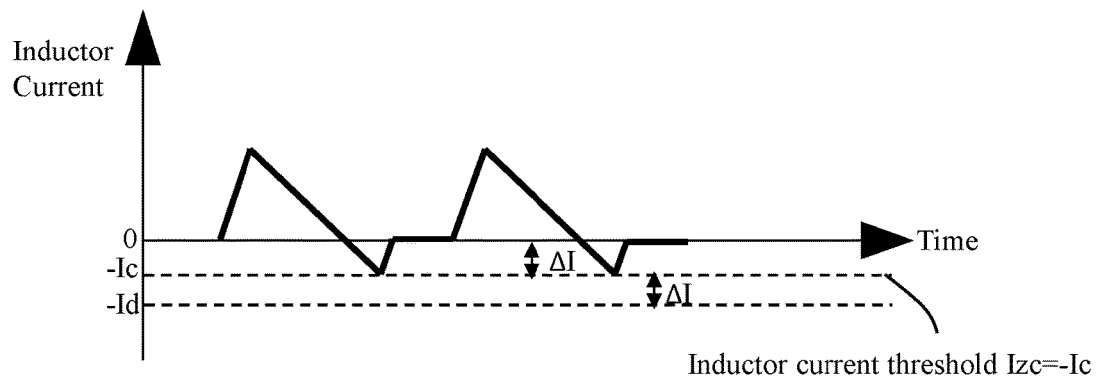
Figure 5C:
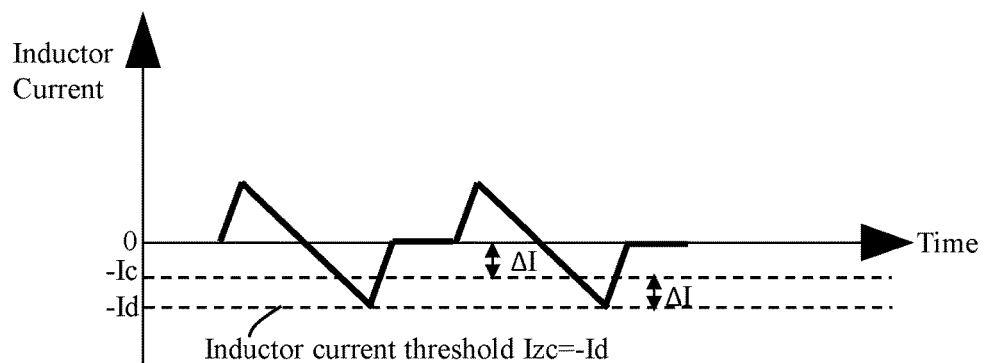

Please refer to FIGS. 5A-5C, which show that the inductor current threshold of the present invention is adjustable. FIG. 5A-5C illustrate the concept as to how the present invention, through adjusting the inductor current threshold Izc of the power stage 12 of the switching regulator 10, ensures an optimized power switching efficiency and an unchanged switching frequency which guarantees there will be no noise interference, even when the switching regulator 10 operates under a light load mode (as shown by the load mode LC2 in FIG. 4) or even an ultra-light load mode (as shown by the load mode LC3 or LC4 in FIG. 4).

As shown in FIGS. 5A-5C, when the switching regulator 10 operates under a light load mode (as shown by the load mode LC2 in FIG. 4) or even an ultra-light load mode (as shown by the load mode LC3 or LC4 in FIG. 4), the inductor current threshold Izc of the power stage 12 of the switching regulator 10 is adjustable.

As shown in FIG. 5A, in one embodiment, when the switching regulator 10 operates under a light load mode (as shown by the load mode LC2 in FIG. 4), the inductor current threshold Izc can be set to, for example but not limited to, zero (i.e., Izc=0). Under such circumstance, when the inductor current IL reduces to zero, the upper gate transistor switch HTS and lower gate transistor switch LTS are both turned OFF.

As shown in FIG. 5B, in another embodiment, when the switching regulator 10 operates under a lighter load mode wherein the required load current is lighter than in the light load mode (as shown by the load mode LC3 in FIG. 4), the inductor current threshold Izc can be set to, for example but not limited to, −Ic (i.e., Izc=−Ic). In one embodiment, the difference between −Ic and 0 is ΔI (i.e., 0−ΔI=−Ic). Under such circumstance, when the inductor current IL reduces to −Ic, the upper gate transistor switch HTS and lower gate transistor switch LTS are both turned OFF.

As shown in FIG. 5C, in still another embodiment, when the switching regulator 10 operates under an ultra-light load mode (as shown by the load mode LC4 in FIG. 4), the inductor current threshold Izc can be set to, for example but not limited to, −Id (i.e., Izc=−Id). In one embodiment, the difference between −Id and −Ic is ΔI (i.e., −Ic−ΔI=−Id). Under such circumstance, when the inductor current IL reduces to −Id, the upper gate transistor switch HTS and lower gate transistor switch LTS are both turned OFF.

Certainly, the number ΔI is only an example; the difference between −Ic and 0 is not limited to ΔI. In another embodiment, the difference between −Ic and 0 can be 2ΔI, 3ΔI or any other number. In addition, the difference between −Id and −Ic is not limited to ΔI. In another embodiment, the difference between −Id and −Ic can be 2ΔI, 3ΔI or any other number.

Moreover, the present invention, it is not necessary for the difference between −Ic and 0 and the difference between −Id and −Ic to be both ΔI. In one embodiment, the difference between −Ic and 0 is ΔI, and the difference between −Id and −Ic is 2ΔI. In another embodiment, the difference between −Ic and 0 is ΔI, and the difference between −Id and −Ic is 3ΔI. That is, according to the present invention, the difference between −Ic and 0 and the difference between −Id and −Ic can be set different.

Besides, according to the present invention, in one embodiment, the above-mentioned difference ΔI can be a discrete number, whereby the curve of inductor current threshold shown in FIG. 4 is a step shape. In another embodiment, the above-mentioned difference ΔI can be a continuous analog number, whereby the curve of inductor current threshold shown in FIG. 4, as it changes in correspondence to the change of the load current, is a continuous analog shape (the details thereof will be described later).

In brief, as shown in FIGS. 5A-5C, when the switching regulator 10 operates under a light load mode, according to the present invention, the PWM controller 11 can adjust the inductor current threshold Izc of the power stage 12. The features and the details as to how the PWM controller 11 of the present invention adjusts the inductor current threshold Izc of the power stage 12 will be described below by taking the synchronous buck power stage circuit of FIG. 2A as an example.

Figure 3A:
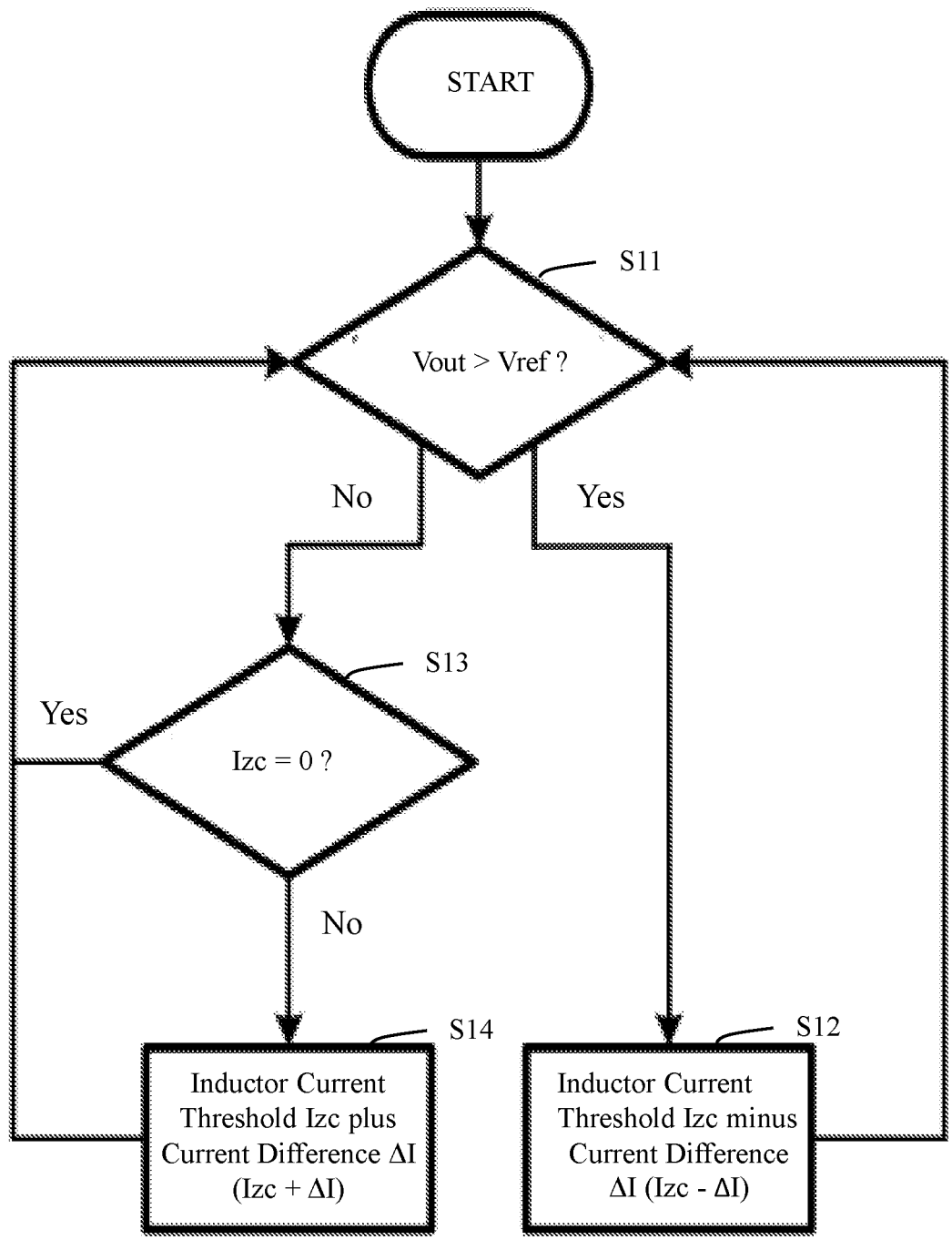
FIG. 3A shows a flowchart of a control method of a switching regulator having an adjustable inductor current threshold according to an embodiment of the present invention.
Figure 3B:
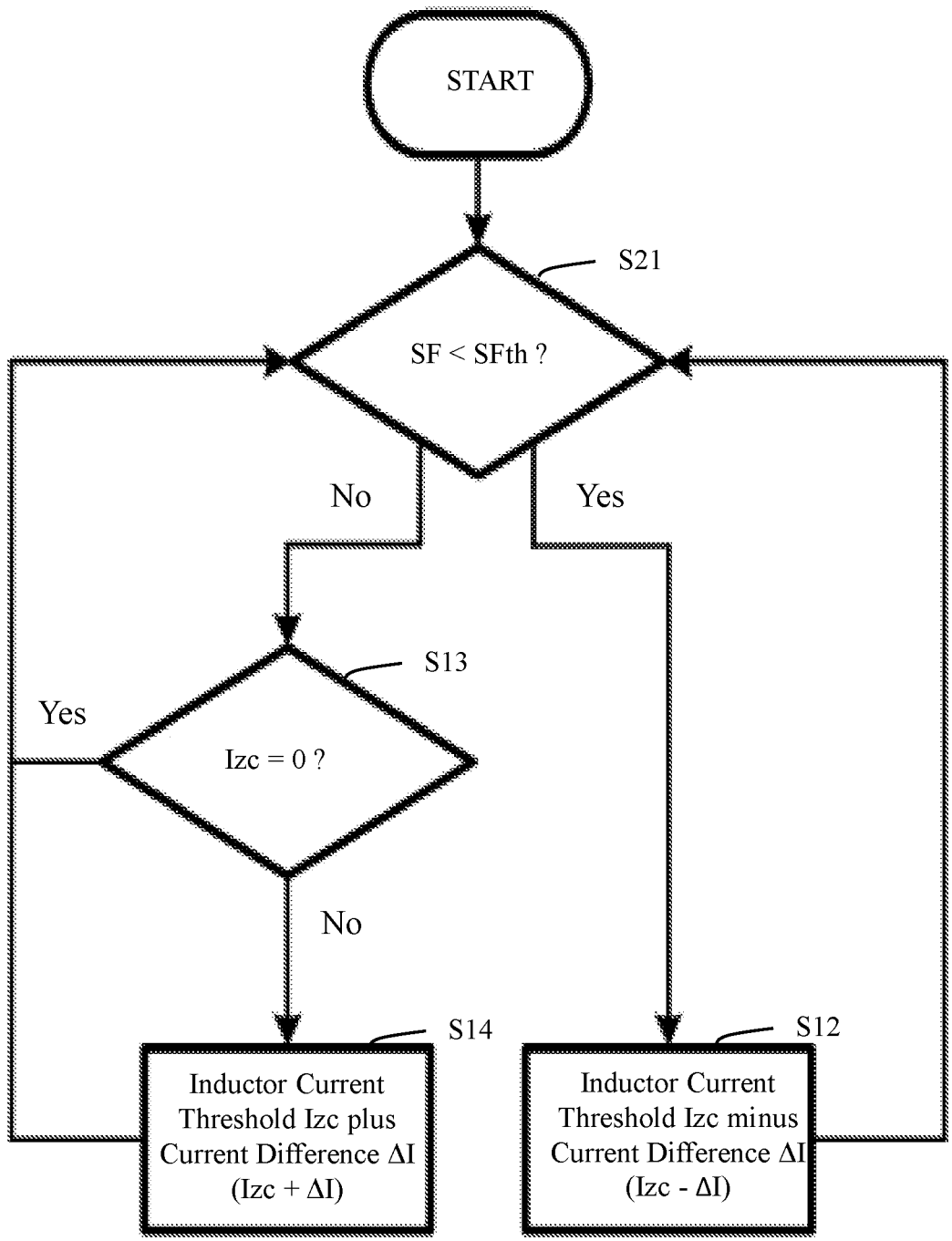
FIG. 3B shows a flowchart of a control method of a switching regulator having an adjustable inductor current threshold according to another embodiment of the present invention.
Figure 7A:
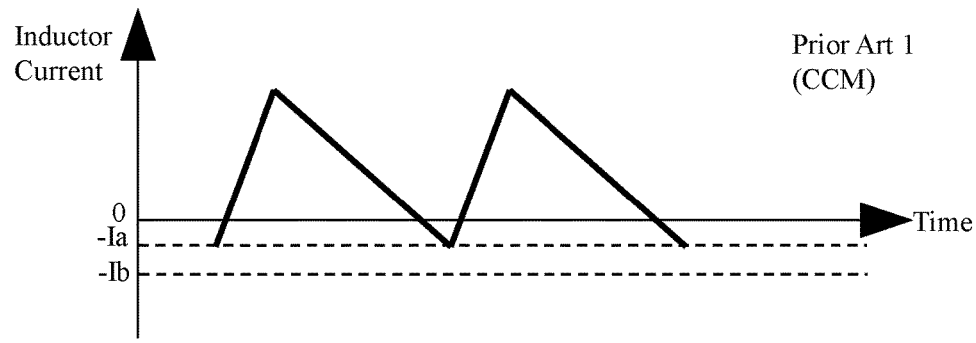
FIG. 7A shows, under CCM operation, a wave form of the inductor current of prior art when the prior art is under a light load mode (corresponding to the load mode LC2 shown in FIG. 4).
Figure 7B:
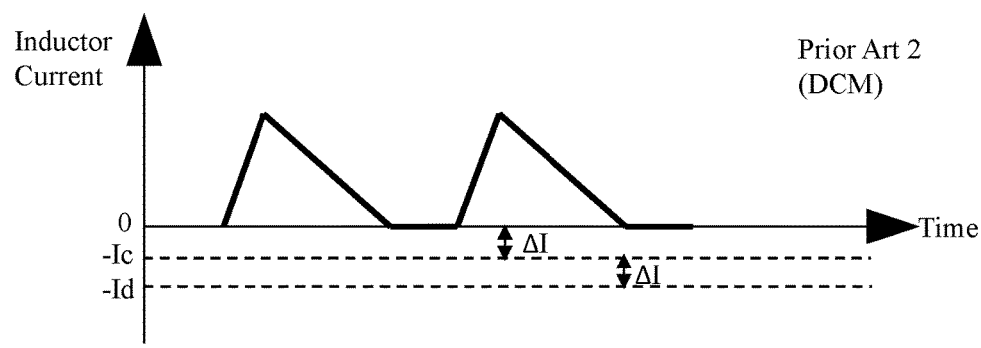
FIG. 7B shows, under DCM operation, a wave form of the inductor current of prior art when the prior art is under a light load mode (corresponding to the load mode LC2 shown in FIG. 4).
Figure 7C:
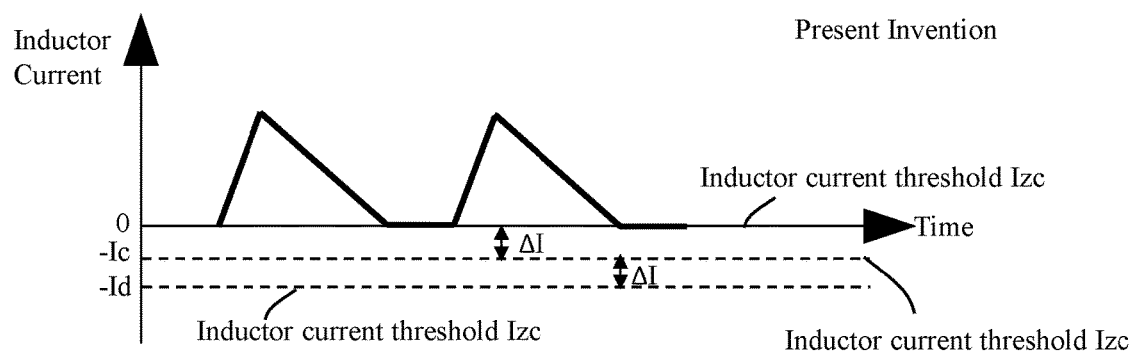
FIG. 7C shows, under a light load mode (corresponding to the load mode LC2 shown in FIG. 4), a wave form of the inductor current of the present invention.

Please refer to FIGS. 3A-3B in conjugation with FIGS. 7A-7C. FIG. 3A shows a flowchart of a control method of a switching regulator having an adjustable inductor current threshold according to an embodiment of the present invention. FIG. 3B shows a flowchart of a control method of a switching regulator having an adjustable inductor current threshold according to another embodiment of the present invention. FIG. 7A shows, under CCM operation, a wave form of the inductor current of prior art when the prior art is under a light load mode (corresponding to the load mode LC2 shown in FIG. 4). FIG. 7B shows, under DCM operation, a wave form of the inductor current of prior art when the prior art is under a light load mode (corresponding to the load mode LC2 shown in FIG. 4). FIG. 7C shows, under a light load mode (corresponding to the load mode LC2 shown in FIG. 4), a wave form of the inductor current of the present invention.

According to the present invention, in one embodiment, it is determined whether an output voltage Vout is greater than a reference voltage Vref. When the output voltage Vout is greater than the reference voltage Vref, the inductor current threshold Izc is adjusted to cause the switching regulator 10 to operate under a pseudo discontinuous conduction mode (PDCM), whereby the switching frequency is not smaller than a predetermined lower frequency limit. In another embodiment, it is determined whether a switching frequency of the power stage is smaller than a predetermined lower frequency limit. When the switching frequency of the power stage is smaller than the predetermined lower frequency limit, the inductor current threshold Izc is adjusted.

Please still refer to FIGS. 3A-3B. When the switching regulator 10 of this embodiment operates under a heavy load mode (corresponding to the load mode LC1 in FIG. 4), because the output voltage Vout will not be greater than the reference voltage Vref and the switching frequency will not be smaller than the predetermined lower frequency limit (generally it remains as a constant), in one embodiment, the PWM controller 11 of the present invention can adjust the inductor current threshold Izc of the power stage 12 to be zero (as shown in FIG. 6C). When the switching regulator 10 operates under a heavy load mode, the valley of the waveform of the inductor current IL will never be zero but always be greater than zero (as shown in FIG. 6C), and therefore, in this embodiment, the inductor current threshold Izc is set to zero under a heavy load mode (as shown in FIG. 6C).

When the switching regulator 10 operates under a light load mode, the inductor current threshold Izc is adjustable. One embodiment of such adjustment is shown in FIG. 3A.

When the load 19 transits from a heavy mode to a light mode, the output voltage Vout might be greater than the reference voltage Vref (FIG. 3A) and the switching frequency SF might be smaller than the predetermined lower frequency limit SFth (FIG. 3B). In one embodiment, the PWM controller 11 of the present invention determines whether the output voltage Vout is greater than a reference voltage Vref (as shown by the step S11 in FIG. 3A). In another embodiment, the PWM controller 11 of the present invention determine whether the switching frequency SF is smaller than the predetermined lower frequency limit SFth (as shown by the step S21 in FIG. 3B).

When it is determined yes in the step S11 in FIG. 3A or yes in the step S21 in FIG. 3B, the PWM controller 11 of the present invention adjusts the inductor current threshold Izc of the power stage 12. In one embodiment, the inductor current threshold Izc is adjusted to be lower. Preferably, the inductor current threshold Izc can be adjusted to be lower than zero.

When it is determined no in the step S11 in FIG. 3A or no in the step S21 in FIG. 3B, the PWM controller 11 of the present invention raises up the inductor current threshold Izc of the power stage 12. In one embodiment, the upper limit of the inductor current threshold Izc is zero. That is, the inductor current threshold Izc is raised up only when it is under zero. if the inductor current threshold Izc has been raised up to zero, the inductor current threshold Izc will remain as zero and remain unchanged.

FIGS. 7A-7C show wave forms of the inductor current, in correspondence to the load mode LC2 shown in FIG. 4. That is, FIGS. 7A-7C show wave forms of the inductor current wherein the load 19 is under a light load mode.

Comparisons among the wave forms of FIGS. 7A-7C show that: when the conventional switching regulator operates under CCM and under a light load mode (as shown by the load mode LC2 in FIG. 4), the sign of the inductor current IL can be negative. That is, the valley of the waveform of the inductor current IL can be smaller than zero (−Ia in the shown example). As described above, this is undesirable because the power delivery efficiency is adversely affected.

In addition, when the conventional switching regulator operates under DCM and under a light load mode (as shown by the load mode LC2 in FIG. 4), when the inductor current IL flowing through the inductor L reduces to zero, the upper gate transistor switch HTS and the lower gate transistor switch LTS are both be turned OFF (taking FIG. 2A as an example), so that the inductor current IL will remain as zero until the next cycle period. In FIG. 7B, the switching frequency SF remains unchanged; however, if the load mode becomes even lighter (e.g., as shown by the load mode LC3 or LC4 in FIG. 4), the zero period will become even longer (as shown in FIG. 8B or FIG. 9B in comparison with FIG. 7B), and equivalently, the switching period becomes longer and the switching frequency is reduced. This will lead to unwanted noise interference.

Please still refer to FIG. 7C. When the switching regulator 10 operates under a light load mode (as shown by the load mode LC2 in FIG. 4), because the load is light but not too light, the output voltage Vout is not greater than a reference voltage Vref and the switching frequency is not smaller than a predetermined lower frequency limit (in this case the switching frequency still remains as a constant). Therefore, according to the present invention, under such circumstance, the inductor current threshold Izc is set to zero, and the operation of the present invention is similar to a typical DCM operation. That is, when the inductor current IL flowing through the inductor L reduces to zero, the upper gate transistor switch HTS and the lower gate transistor switch LTS are both be turned OFF (taking the circuit of FIG. 2A as an example), so that the inductor current IL will remain as zero until the next cycle period. From another perspective, when the output voltage Vout is not greater than a reference voltage Vref or when the switching frequency is not smaller than a predetermined lower frequency limit, as long as the inductor current threshold Izc is zero, it is not necessary to adjust the inductor current threshold Izc. In other words, in one embodiment, the upper limit of the inductor current threshold Izc is zero and the inductor current threshold Izc will not be raised up to higher than zero.

Figure 8A:
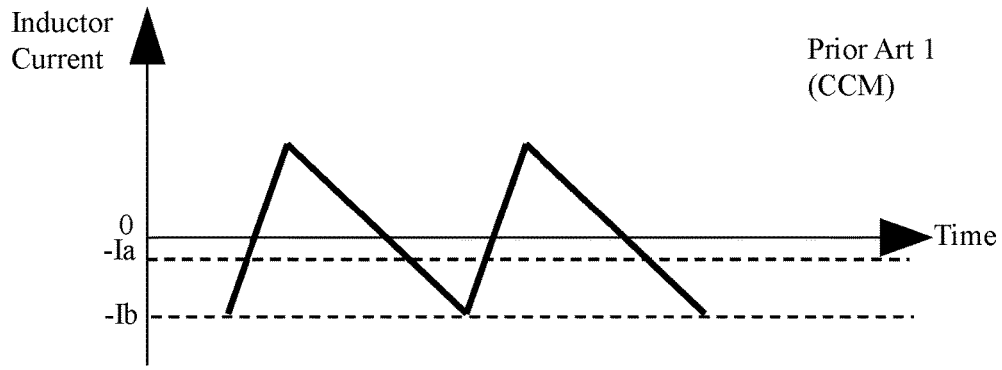
FIG. 8A shows, under CCM operation, a wave form of the inductor current of prior art when the prior art is under another light load mode (corresponding to the load mode LC3 shown in FIG. 4).
Figure 8B:
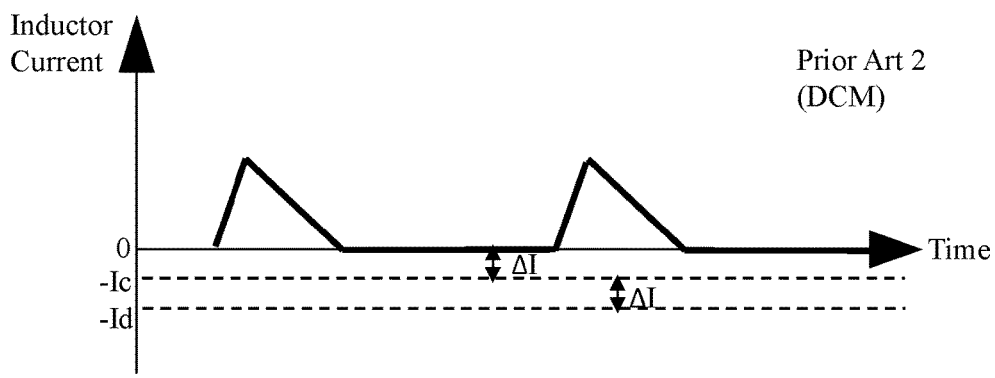
FIG. 8B shows, under DCM operation, a wave form of the inductor current of prior art when the prior art is under another light load mode (corresponding to the load mode LC3 shown in FIG. 4).
Figure 8C:
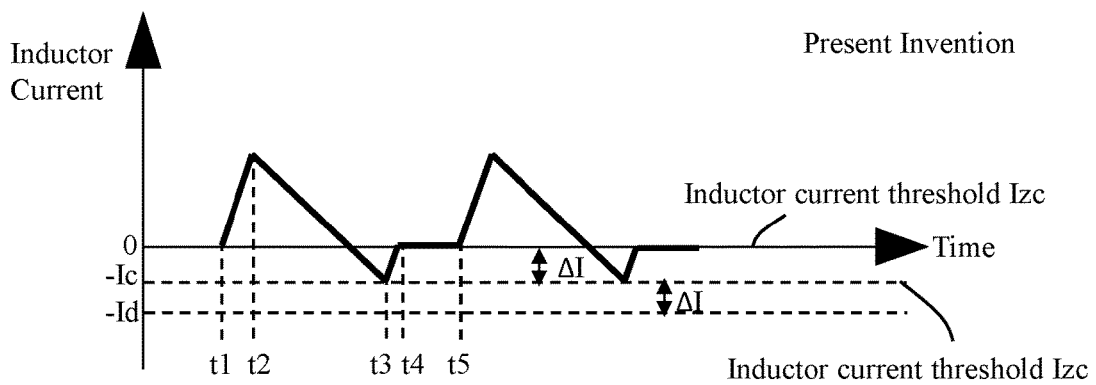
FIG. 8C shows, under another light load mode (corresponding to the load mode LC3 shown in FIG. 4), a wave form of the inductor current of the present invention.

Please refer to FIG. 3A-3B in conjugation with FIGS. 8A-8C. FIG. 8A shows, under CCM operation, a wave form of the inductor current of prior art when the prior art is under a light load mode which is lighter than FIG. 7A (corresponding to the load mode LC3 shown in FIG. 4). FIG. 8B shows, under DCM operation, a wave form of the inductor current of prior art when the prior art is under a light load mode which is lighter than FIG. 7B (corresponding to the load mode LC3 shown in FIG. 4). FIG. 8C shows, under a light load mode which is lighter than FIG. 7C (corresponding to the load mode LC3 shown in FIG. 4), a wave form of the inductor current of the present invention.

When the load 19 is under a light mode, in one embodiment (as shown in FIG. 3A), the PWM controller 11 of the present invention determines whether the output voltage Vout is greater than a reference voltage Vref (as shown by the step S11 in FIG. 3A). When the load 19 is under a light mode, in another embodiment (as shown in FIG. 3B), the PWM controller 11 of the present invention determines whether the switching frequency SF is smaller than the predetermined lower frequency limit SFth (as shown by the step S21 in FIG. 3B).

When it is determined yes in the step S11 in FIG. 3A or yes in the step S21 in FIG. 3B, the PWM controller 11 of the present invention adjusts the inductor current threshold Izc of the power stage 12 to be lower than zero.

When it is determined no in the step S11 in FIG. 3A or no in the step S21 in FIG. 3B, the PWM controller 11 of the present invention raises up the inductor current threshold Izc of the power stage 12. In one embodiment, the inductor current threshold Izc is raised up at most to zero.

FIGS. 8A-8C show wave forms of the inductor current in correspondence to the load mode LC3 shown in FIG. 4. That is, FIGS. 8A-8C show wave forms of the inductor current wherein the load 19 is under a light load mode which is lighter than the load mode LC2.

Comparisons among the wave forms of FIGS. 8A-8C show that: when the conventional switching regulator operates under CCM and under a light load mode (as shown by the load mode LC3 in FIG. 4), the waveform of the inductor current IL and the drawback of low efficiency are similar to the waveform of FIG. 8A.

In addition, FIG. 8B shows, under DCM operation, a wave form of the inductor current of prior art when the prior art is under a light load mode which is lighter than FIG. 7B (corresponding to the load mode LC3 shown in FIG. 4). A comparison between the wave forms of FIG. 7B and FIG. 8B shows that: the switching frequency SF of the inductor current IL in FIG. 8B is lower than the switching frequency SF of the inductor current IL in FIG. 7B. That is, when the conventional switching regulator operates under DCM and under a relatively lighter load mode (as shown by the load mode LC3 in FIG. 4), the switching frequency SF of the inductor current IL reduces according to the load condition, which can lead to unwanted noise interference. On the other hand, an undesirable ripple effect will be enhanced.

In contrast, when the switching regulator 10 according to the present invention operates under such relatively lighter load mode (as shown by the load mode LC3 in FIG. 4), the valley of the waveform of the inductor current IL can be adjusted to −Ic, as shown in FIG. 8C. The situation shown in FIG. 8C corresponds to the case "when it is determined yes in the step S11 in FIG. 3A or yes in the step S21 in FIG. 3B"; under such circumstance, the PWM controller 11 of the present invention adjusts the inductor current threshold Izc of the power stage 12, so that the switching regulator 10 can operate under a pseudo discontinuous conduction mode (PDCM). In one embodiment, when it is determined yes in the step S11 in FIG. 3A or yes in the step S21 in FIG. 3B, the inductor current threshold Izc is adjusted to be lower than zero. In other words, when the switching regulator 10 operates under a relatively lighter load mode (as shown by the load mode LC3 in FIG. 4), if the output voltage Vout is greater than a reference voltage Vref or the switching frequency is smaller than a predetermined lower frequency limit, the above-mentioned adjustment of the inductor current threshold Izc is initiated.

The term "pseudo discontinuous conduction mode (PDCM)" is meant to indicate a conduction mode that is similar to DCM but not exactly DCM: because the present invention dynamically adjusts the inductor current threshold Izc, i.e., the inductor current threshold Izc is not always zero but is sometimes another value (e.g., as −Ic shown in FIG. 8C), the upper gate transistor switch HTS and the lower gate transistor switch LTS are both be turned OFF (taking FIG. 2A as an example) when the inductor current IL reaches the adjusted inductor current threshold Izc, and kept OFF until the next cycle period. Therefore, in PDCM, the inductor current will have a zero period and there may be a short negative period.

According to the present invention, operating under PDCM has the following merits. First, when the inductor current IL reaches the inductor current threshold Izc (e.g., −Ic), the upper gate transistor switch HTS and the lower gate transistor switch LTS are both turned OFF; hence, the conduction loss is reduced as compared to the conventional switching regulator operating under CCM. Second, because the inductor current threshold Izc is adjustable, the switching frequency SF of the power stage can be controlled to be not smaller than a predetermined lower frequency limit. Preferably, in one embodiment, the switching frequency SF is controlled to substantially remain at a constant frequency. For example, the switching frequency SF can remain the same as the frequency when the switching regulator 10 operates under a heavy mode. On the other hand, an unwanted ripple effect on the output voltage can be effectively suppressed.

It should be explained that, due to manufacturing variations and non-ideal matching among the components, although the objective is to maintain the switching frequency SF at a constant frequency, the actual switching frequency SF might not be exactly a constant, but may slightly vary. That is, in the present invention, it is acceptable that there is a margin of error in the switching frequency SF due to imperfectness of the circuit components. Therefore, "substantially" remaining at a constant frequency should allow a tolerable variation. The term "substantially" as used herein and elsewhere of the present invention is meant to indicate that a tolerable error is allowed.

According to the present invention, in some of the light modes (e.g., the light mode LC3), the upper gate transistor switch HTS and the lower gate transistor switch LTS are both turned OFF after the inductor current IL has reached the inductor current threshold Izc which is non-zero (e.g., −Ic); in such case, the inductor current IL is not zero when the switches are both OFF. According to the present invention, as shown in FIG. 8C, the inductor current IL can be raised up from −Ic to zero (as shown by the period from the time point t3 to the time point t4 in FIG. 8C) through, for example but not limited to, a body diode of the upper gate transistor switch HTS. Next, the inductor current IL (i.e., after the time point t4 in FIG. 8C) remains as zero until the next switching period (which starts from the time point t5 in FIG. 8C). In another embodiment, the inductor current IL can be raised up from −Ic to zero through, for example but not limited to, controlling the upper gate transistor switch HTS or the lower gate transistor switch LTS to be ON, depending on the structure of the power stage (taking FIG. 2A as an example, the upper gate transistor switch HTS will be the one that is turned ON), as shown by the period from the time point t3 to the time point t4 in FIG. 8C). Thereafter, the upper gate transistor switch HTS and the lower gate transistor switch LTS are both turned OFF and the inductor current IL remains as zero until the next switching period (which starts from the time point t5 in FIG. 8C), thus reducing the unwanted conduction loss.

In one embodiment, the PWM controller 11 can reduce inductor current threshold Izc step-wisely, for example but not limited to, by subtracting a difference ΔI from the inductor current threshold Izc (as shown by the step S12 in FIG. 3A and FIG. 3B), to reduce the level of the inductor current threshold Izc. In one embodiment, as shown in FIG. 8C, the inductor current threshold Izc can be set to, for example but not limited to, −Ic (i.e., Izc=−Ic), and the difference between −Ic and 0 is ΔI (i.e., 0−ΔI=−Ic).

Figure 9A:
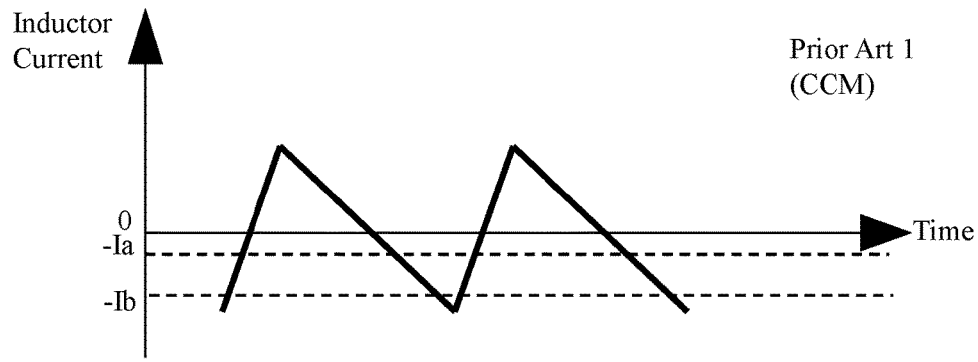
FIG. 9A shows, under CCM operation, a wave form of the inductor current of prior art when the prior art is under still another light load mode (corresponding to the load mode LC4 shown in FIG. 4).
Figure 9B:
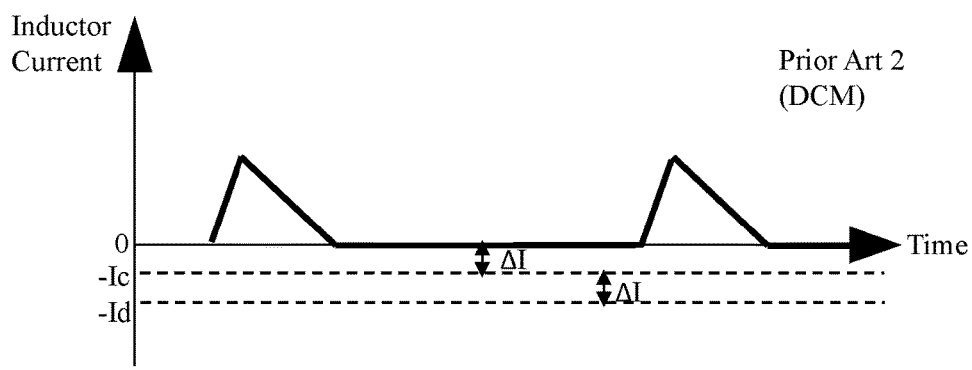
FIG. 9B shows, under DCM operation, a wave form of the inductor current of prior art when the prior art is under still another light load mode (corresponding to the load mode LC4 shown in FIG. 4).
Figure 9C:
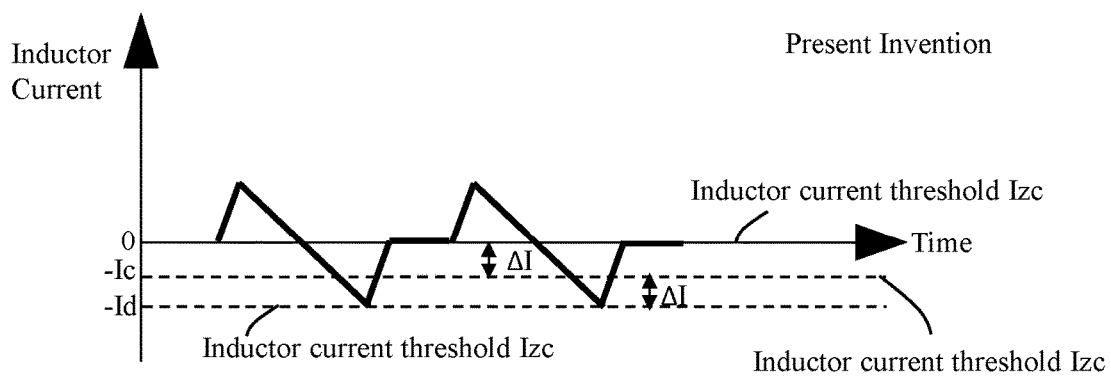
FIG. 9C shows, under another light load mode (corresponding to the load mode LC4 shown in FIG. 4), a wave form of the inductor current of the present invention.

Please refer to FIGS. 3A-3B in conjugation with FIGS. 9A-9C. FIG. 9A shows, under CCM operation, a wave form of the inductor current of prior art when the prior art is under another light load mode which is even lighter (corresponding to the load mode LC4 shown in FIG. 4). FIG. 9B shows, under DCM operation, a wave form of the inductor current of prior art when the prior art is under still another light load mode which is even lighter (corresponding to the load mode LC4 shown in FIG. 4). FIG. 9C shows, under another light load mode which is even lighter (corresponding to the load mode LC4 shown in FIG. 4), a wave form of the inductor current of the present invention.

FIGS. 9A-9C are similar to FIGS. 8A-8C, respectively. As shown in FIG. 9A, when the conventional switching regulator operates under CCM and under an ultra-light mode (corresponding to the load mode LC4 shown in FIG. 4), the valley of the inductor current IL in FIG. 9A is a negative value which is even lower than the valley of the inductor current IL in FIG. 8A. As shown in FIG. 9B, when the conventional switching regulator operates under DCM and under an ultra-light mode (corresponding to the load mode LC4 shown in FIG. 4), the switching frequency SF of the inductor current IL is even lower than the switching frequency SF of the inductor current IL in FIG. 8B. As shown in FIG. 9C, when the switching regulator 10 operates under an ultra-light mode (corresponding to the load mode LC4 shown in FIG. 4 and corresponding to "when it is determined yes in the step S11 in FIG. 3A or yes in the step S21 in FIG. 3B"), the PWM controller 11 of the present invention adjusts the inductor current threshold Izc of the power stage 12 to −Id, which is a negative value lower than −Ic in FIG. 8C. When the inductor current IL reaches the inductor current threshold Izc (−Id as shown in FIG. 9C), the PWM controller 11 turns OFF the upper gate transistor switch HTS and the lower gate transistor switch LTS (taking FIG. 2A as an example) until the next switching period, whereby the switching regulator 10 operates under "pseudo discontinuous conduction mode (PDCM)".

In one embodiment, the PWM controller 11 can, for example but not limited to, subtract a difference ΔI from the previously set inductor current threshold Izc (as shown by the step S12 in FIG. 3A and FIG. 3B), to reduce the level of the inductor current threshold Izc to be smaller than zero. In one embodiment, referring to FIGS. 8C and 9C, when the load mode transits from LC3 to LC4, the inductor current threshold Izc in FIG. 8C (i.e. −Ic in the given example) is further reduced by one unit of the difference ΔI (as shown by the step S12 in FIG. 3A and FIG. 3B), so that the inductor current threshold Izc is adjusted to −Id (i.e., Izc=−Id). The difference between −Id and −Ic is ΔI (i.e., −Ic−ΔI=−Id).

One advantage and feature of the present invention is that the PWM controller 11 of the present invention can raise up or lower down the inductor current threshold Izc according to the condition of the load mode (e.g., according to a transition of load mode from LC4 to LC3, or from LC3 to LC4).

Please compare the waveforms of FIG. 9C, FIG. 8C and FIG. 7C (wherein, FIG. 9C, FIG. 8C and FIG. 7C correspond to load modes LC4, LC3 and LC2, respectively).

In the given example, the load mode LC4 is lighter than the load mode LC3, and the load mode LC3 is lighter than the load mode LC2.

First, in the case of FIG. 9C (please also refer to FIGS. 5A-5C), when it is determined no in the step S11 in FIG. 3A or no in the step S21 in FIG. 3B, the PWM controller 11 further determines whether the inductor current threshold Izc is equal to zero (as shown by the step S13 in FIG. 3A and FIG. 3B).

When it is determined yes in the step S13 in FIG. 3A and FIG. 3B, the PWM controller 11 returns back to the step S11 in FIG. 3A, so as to further determine whether the output voltage Vout is greater than a reference voltage Vref. Or, the PWM controller 11 returns back to the step S21 in FIG. 3B, so as to further determine the switching frequency SF is smaller than the predetermined lower frequency limit SFth.

In one embodiment, when it is determined no in the step S13 in FIG. 3A and FIG. 3B, the PWM controller 11 can add a difference ΔI to the inductor current threshold Izc of the power stage 12 (as shown by the step S14 in FIG. 3A and FIG. 3B), so as to raise up the inductor current threshold Izc.

Please compare FIG. 9C with FIG. 8C. In one embodiment, when the load mode transits from LC4 corresponding to FIG. 9C to LC3 corresponding to FIG. 8C, i.e., transition from an ultra-light load mode to a light load mode (under such circumstance, when it is determined no in the step S13 in FIG. 3A and FIG. 3B), the inductor current threshold Izc shown in FIG. 9C (for example but not limited to, −Id) can be raised up, for example but not limited to, from −Id shown in FIG. 9C to −Ic shown in FIG. 8C (i.e., −Id+ΔI=−Ic).

Please compare FIG. 8C with FIG. 7C. In another embodiment, when the load mode transits from LC3 corresponding to FIG. 8C to LC2 corresponding to FIG. 7C, i.e., transition from a lighter load mode LC3 to a light load mode LC2 (under such circumstance, when it is determined no in the step S13 in FIG. 3A and FIG. 3B), the inductor current threshold Izc shown in FIG. 8C (for example but not limited to, −Ic) can be raised up, for example but not limited to, from −Ic shown in FIG. 8C to 0 shown in FIG. 7C (i.e., −Ic+ΔI=0).

As such, an advantage and feature of the present invention is that: when the switching regulator 10 operates under different light load modes (as shown by the load modes LC2, LC3 or LC4 in FIG. 4), the PWM controller 11 can raise up or lower down the inductor current threshold Izc according to the change between load modes, to better match the load condition. Thus, the total power consumption is optimized and the unwanted switching noise interference and output voltage ripple effect is effectively reduced.

According to the present invention, the inductor current threshold Izc is not limited to being raised up or lowered down step-wisely through the above-mentioned difference ΔI which is a discrete value. In another embodiment, the inductor current threshold Izc can be adjusted continuously in analog form.

Figure 11:
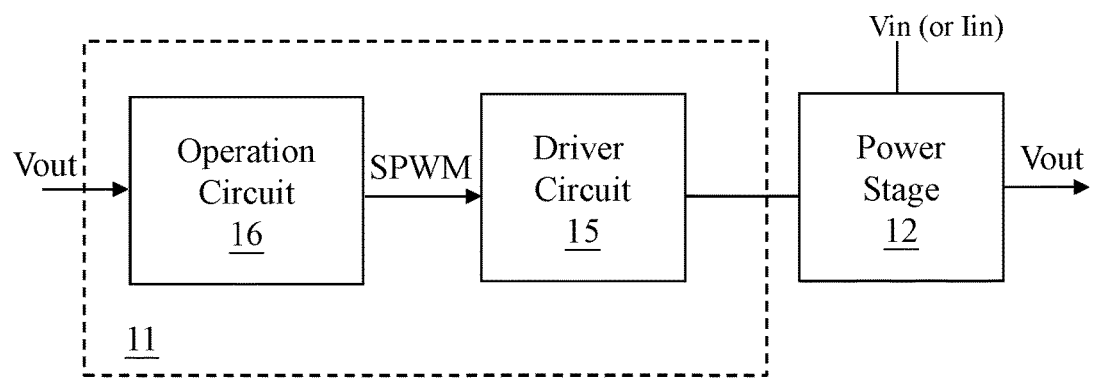
FIG. 11 shows, in a switching regulator having an adjustable inductor current threshold of the present invention, a specific embodiment of a PWM controller.

Please refer to FIG. 11, which shows, in a switching regulator having an adjustable inductor current threshold according to the present invention, a specific embodiment of a PWM controller 11. The PWM controller 11 includes a driver circuit 15 and an operation circuit 16. The driver circuit is configured to operably control the first power transistor and the second power transistor according to a PWM signal SPWM. The operation circuit 16 is configured to operably generate the PWM signal SPWM, thereby controlling the switching regulator to fulfill all of the functions described above. The operation circuit 16 determines whether the output voltage is greater than a reference voltage or determines whether the switching frequency of the power stage 12 is smaller than a predetermined lower frequency limit. If yes, the operation circuit 16 adjusts the the inductor current threshold Izc.

Figure 12:
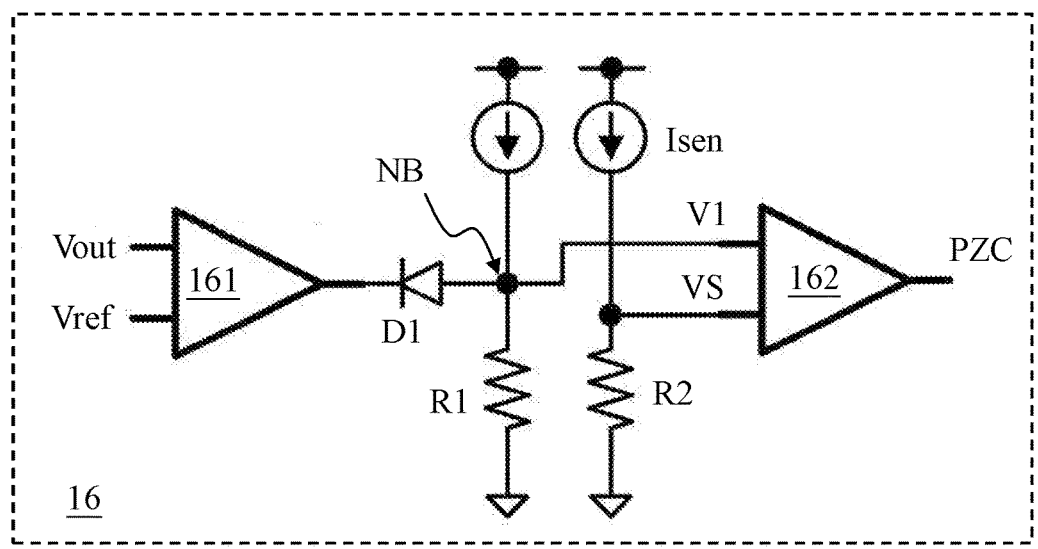
FIG. 12 shows, in a switching regulator having an adjustable inductor current threshold of the present invention, a specific embodiment of an operation circuit.

Please refer to FIG. 12, which shows, in a switching regulator having an adjustable inductor current threshold according to the present invention, a specific embodiment of an operation circuit 16. The operation circuit 16 includes a transconductance amplifier circuit 161 and a comparison circuit 162. The transconductance amplifier circuit 161 is configured to operably generate a base level signal V1 (in this embodiment, it is generated through a resistor R1) at a base level node NB according to a difference between the output voltage Vout and the reference voltage Vref, wherein the base level signal V1 corresponds to the inductor current threshold Izc. The comparison circuit 162 is configured to operably compare the base level signal V1 with a signal VS related to the inductor current IL, to generate a pseudo zero current signal PZC, wherein the pseudo zero current signal PZC indicates that the inductor current IL has reached the inductor current threshold Izc. When the pseudo zero current signal PZC indicates that the inductor current IL has reached the inductor current threshold Izc, the PWM controller 11 can turn OFF both the upper gate transistor switch HTS and the lower gate transistor switch LTS (taking FIG. 2A as an example), so as to achieve the above-mentioned "pseudo discontinuous conduction mode (PDCM)" operation. The signal VS related to the inductor current IL is shown in FIG. 12 and can be obtained for example through conversion from an inductor current sensing signal Isen (in this embodiment, it is generated through a resistor R2). The inductor current sensing signal Isen is related to the inductor current IL and can be obtained through sensing the inductor current IL. The base level signal V1 generated from the transconductance amplifier circuit 161 corresponds to the above-mentioned inductor current threshold Izc. In this embodiment, the transconductance amplifier circuit 161 adjusts the base level signal V1 (corresponding to the inductor current threshold Izc) in a continuous analog manner according to a difference between the output voltage Vout and the reference voltage Vref, so as to achieve the above-mentioned PDCM operation. In another embodiment, the operation circuit 16 may further include a diode D1, for controlling a current direction of an output terminal of the transconductance amplifier circuit 161 to limit the base level signal V1, such that the inductor current threshold Izc which corresponds to the base level signal V1 is at most zero.

Figure 10A:
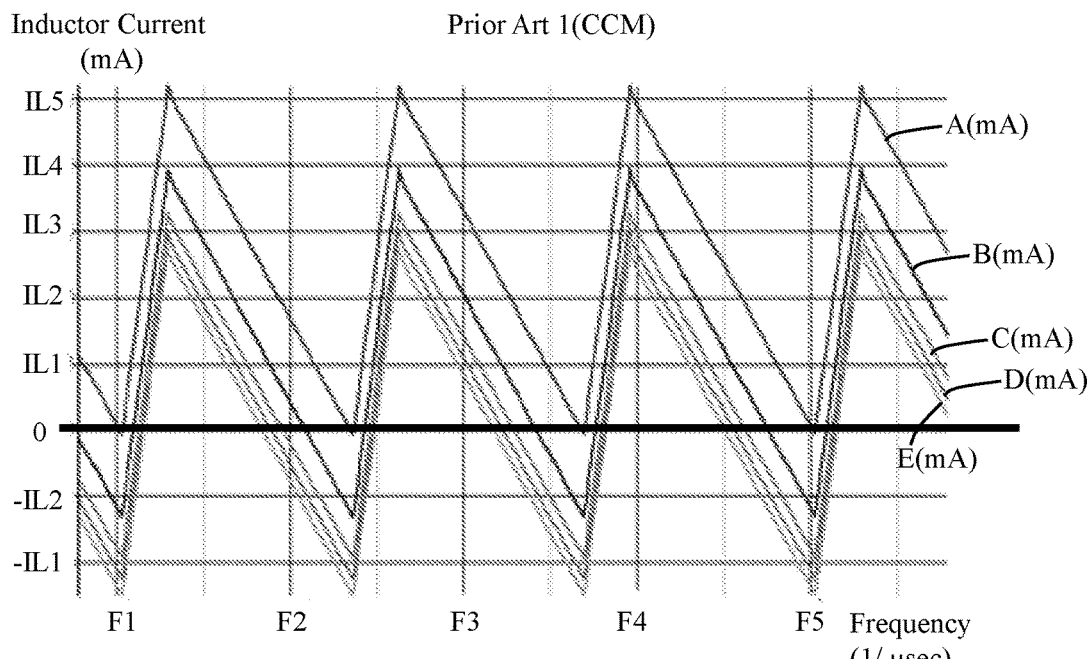
FIG. 10A-10B show that through adjusting the inductor current threshold, the present invention can achieve the same efficacy as the prior art, and the switching frequency of the present invention is a constant frequency.
Figure 10B:
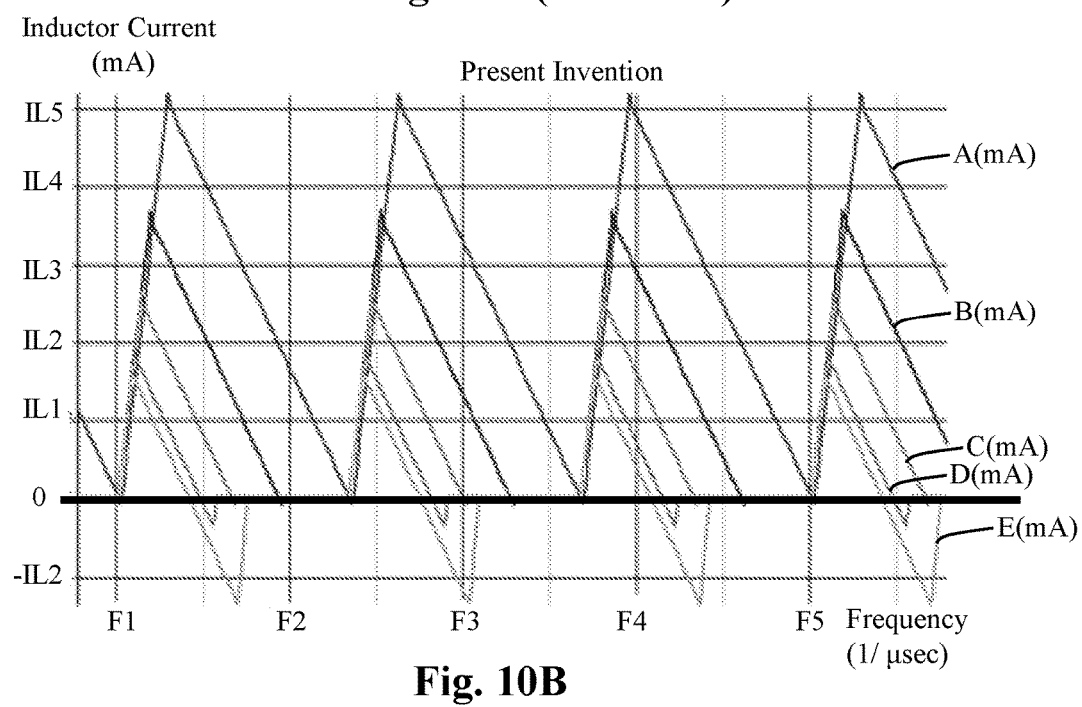

Please refer to FIG. 10A-10B, which show that through adjusting the inductor current threshold, the present invention can provide the same effect as the prior art CCM operation does, i.e., the switching frequency of the present invention can be maintain as a constant.

A comparison between the wave forms of FIGS. 10A-10B shows that: when the conventional switching regulator operates under CCM and under a light load mode (as shown by the load modes LC2, LC3 or LC4 in FIG. 4), the valley of the waveform of the inductor current IL will be smaller than zero, as shown in FIG. 10A. This will cause a drawback, which is the undesirable conduction loss. Although the prior art shown in FIG. 10A has the above-mentioned drawback, the prior art operating in CCM under light load has a merit that the switching frequency of its power stage is a constant. Accordingly, the prior art shown in FIG. 10A can tackle the issue of noise interference caused by reducing frequency in a conventional switching regulator operating under DCM.

In comparison with the prior art shown in FIG. 10A, the present invention shown in FIG. 10B has an advantage that: when the switching regulator 10 operates under a light load mode (as shown by the load modes LC2, LC3 or LC4 in FIG. 4), the PWM controller 11 can maintain the switching frequency SF of the power stage 12 to be a constant through adjusting the inductor current threshold Izc of the power stage 12. Both the switching frequency SF of the power stage 12 of the present invention and the switching frequency SF of the prior art shown in FIG. 10A have a constant frequency instead of a variable frequency. Thus, when the switching regulator 10 operates under a light load mode (as shown by the load mode LC2 in FIG. 4) or even an ultra-light load mode (as shown by the load mode LC3 or LC4 in FIG. 4), the total power consumption is optimized and the unwanted switching noise interference and output voltage ripple effect is effectively reduced.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch. For another example, the above-mentioned transconductance amplifier circuit of the operation circuit can be replaced by other type of amplifier circuit in another embodiment, such as a subtraction amplifier circuit. For yet another example, the details for the above-mentioned embodiments are discussed taking a buck switching regulator as an example. It is practicable and within the scope of the present invention to employ other types of switching regulators. In the application of employing other types of switching regulators, corresponding amendments can be made as well known to those skilled in the art. Further, because the polarities of the input terminals of a comparator or an operational amplifier can be interchanged, the above-mentioned terms "at most", "lowering down" and "raising up" applied onto the inductor current threshold can be modified or even reversed. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A control method of a switching regulator which has an adjustable inductor current threshold, wherein the switching regulator is configured to operably convert an input power to an output power and supply the output power to an external load, the switching regulator comprising a pulse width modulation (PWM) controller and a power stage, the power stage including: an inductor, a first power transistor and a second power transistor, which are coupled to one another, the PWM controller being configured to operably control the first power transistor and the second power transistor to convert the input power to the output power, wherein when an inductor current reaches an inductor current threshold, the PWM controller turns OFF the first power transistor and the second power transistor, the control method of the switching regulator having the adjustable inductor current threshold comprising the steps of:
   (S1) determining whether an output voltage is greater than a reference voltage or determining whether a switching frequency of the power stage is smaller than a predetermined lower frequency limit; and
   (S2) when it is determined yes in the step (S1), adjusting the inductor current threshold, such that the switching regulator operates under a pseudo discontinuous conduction mode (PDCM), wherein the switching frequency is controlled to be not smaller than the predetermined lower frequency limit by adjusting the inductor current threshold, and wherein there are at least two discrete inductor current threshold targets smaller than zero for the inductor current threshold to be adjusted to.

2. The control method of the switching regulator of claim 1, wherein the step (S2) further includes: lowering down the inductor current threshold to be smaller than zero.

3. The control method of the switching regulator of claim 1, further comprising:
   (S3) when it is determined no in the step (S1), raising up the inductor current threshold.

4. The control method of the switching regulator of claim 3, wherein the inductor current threshold is raised up at most to zero.

5. The control method of the switching regulator of claim 3, wherein the step of raising up the inductor current threshold includes: raising up the inductor current threshold step-wisely by a predetermined difference value; and wherein the step of lowering down the inductor current threshold includes: lowering down the inductor current threshold step-wisely by the predetermined difference value.

6. The control method of the switching regulator of claim 1, wherein the switching frequency of the power stage is maintained at a constant frequency.

7. The control method of the switching regulator of claim 1, wherein before the first power transistor and the second power transistor are turned OFF, the first power transistor or the second power transistor is ON to cause the inductor current to be raised up, until the inductor current is raised up to zero, and then the first power transistor and the second power transistor are turned OFF.

8. A switching regulator which has an adjustable inductor current threshold, wherein the switching regulator is configured to operably convert an input power to an output power and supply the output power to an external load; the switching regulator comprising:
   a power stage including an inductor, a first power transistor and a second power transistor, which are coupled to one another; and
   a pulse width modulation (PWM) controller, which is configured to operably control the first power transistor and the second power transistor to convert the input power to the output power;
   wherein, when an inductor current reaches an inductor current threshold, the PWM controller turns OFF the first power transistor and the second power transistor;
   wherein, the PWM controller includes:
   a driver circuit, which is configured to operably control the first power transistor and the second power transistor according to a PWM signal; and
   an operation circuit, which is configured to operably generate the PWM signal, wherein the operation circuit is configured to determine whether an output voltage is greater than a reference voltage or determining whether a switching frequency of the power stage is smaller than a predetermined lower frequency limit; when the output voltage is greater than the reference voltage or when the switching frequency of the power stage is smaller than the predetermined lower frequency limit, the operation circuit adjusts the inductor current threshold such that the switching regulator operates under a pseudo discontinuous conduction mode (PDCM), wherein the switching frequency is controlled to be not smaller than the predetermined lower frequency limit by adjusting the inductor current threshold, and wherein there are at least two discrete inductor current threshold targets smaller than zero for the inductor current threshold to be adjusted to.

9. The switching regulator of claim 8, wherein when the output voltage is greater than the reference voltage or when the switching frequency of the power stage is smaller than the predetermined lower frequency limit, the operation circuit lowers the inductor current threshold to be smaller than zero.

10. The switching regulator of claim 9, wherein when the output voltage is not greater than the reference voltage and the switching frequency of the power stage is not smaller than the predetermined lower frequency limit, the operation circuit raises up the inductor current threshold.

11. The switching regulator of claim 10, wherein the inductor current threshold is raised up at most to zero.

12. The switching regulator of claim 10, wherein the operation circuit raises up or lowers the inductor current threshold step-wisely by a predetermined difference value.

13. The switching regulator of claim 8, wherein the switching frequency of the power stage is maintained at a constant frequency.

14. The switching regulator of claim 8, wherein before the first power transistor and the second power transistor are turned OFF, the first power transistor or the second power transistor is ON to cause the inductor current to be raised up, until the inductor current is raised up to zero, and then the first power transistor and the second power transistor are turned OFF.

15. The switching regulator of claim 11, wherein the operation circuit includes:
   an amplifier circuit, which is configured to operably generate a base level signal according to a difference between the output voltage and the reference voltage, wherein the base level signal corresponds to the inductor current threshold; and
   a comparison circuit, which is configured to operably compare the base level signal with a signal related to the inductor current, to generate a pseudo zero current signal, wherein pseudo zero current signal indicates whether the inductor current has reached the inductor current threshold.

16. The switching regulator of claim 15, wherein the operation circuit further includes a unidirectional conductive circuit for controlling a current direction of an output terminal of the amplifier circuit to limit the base level signal, such that the inductor current threshold is at most zero.

17. A PWM controller, which is configured to operably control a switching regulator, wherein the switching regulator is configured to operably convert an input power to an output power and supply the output power to an external load; the switching regulator comprising: a power stage including an inductor, a first power transistor and a second power transistor, which are coupled to one another, wherein the PWM controller controls the first power transistor and the second power transistor to convert the input power to the output power; wherein when an inductor current reaches an inductor current threshold, the PWM controller turns OFF the first power transistor and the second power transistor; the PWM controller comprising:
a driver circuit, which is configured to operably control the first power transistor and the second power transistor according to a PWM signal; and
an operation circuit, which is configured to operably generate the PWM signal, wherein the operation circuit is configured to determine whether an output voltage is greater than a reference voltage or determining whether a switching frequency of the power stage is smaller than a predetermined lower frequency limit; when the output voltage is greater than the reference voltage or when the switching frequency of the power stage is smaller than the predetermined lower frequency limit, the operation circuit adjusts the inductor current threshold such that the switching regulator operates under a pseudo discontinuous conduction mode (PDCM), wherein the switching frequency is controlled to be not smaller than the predetermined lower frequency limit by adjusting the inductor current threshold, and wherein there are at least two discrete inductor current threshold targets smaller than zero for the inductor current threshold to be adjusted to.

18. The PWM controller of claim 17, wherein when the output voltage is greater than the reference voltage or when the switching frequency of the power stage is smaller than the predetermined lower frequency limit, the operation circuit lowers the inductor current threshold to be smaller than zero.

19. The PWM controller of claim 18, wherein when the output voltage is not greater than the reference voltage and the switching frequency of the power stage is not smaller than the predetermined lower frequency limit, the operation circuit raises up the inductor current threshold.

20. The PWM controller of claim 19, wherein the inductor current threshold is raised up at most to zero.

21. The PWM controller of claim 19, wherein the operation circuit raises up or lowers the inductor current threshold step-wisely by a predetermined difference value.

22. The PWM controller of claim 17, wherein the switching frequency of the power stage is maintained at a constant frequency.

23. The PWM controller of claim 17, wherein before the first power transistor and the second power transistor are turned OFF, the first power transistor or the second power transistor is ON to cause the inductor current to be raised up, until the inductor current is raised up to zero, and then the first power transistor and the second power transistor are turned OFF.

24. The PWM controller of claim 20, wherein the operation circuit includes:
an amplifier circuit, which is configured to operably generate a base level signal according to a difference between the output voltage and the reference voltage, wherein the base level signal corresponds to the inductor current threshold; and
a comparison circuit, which is configured to operably compare the base level signal with a signal related to the inductor current, to generate a pseudo zero current signal, wherein pseudo zero current signal indicates whether the inductor current has reached the inductor current threshold.

25. The PWM controller of claim 20, wherein the operation circuit further includes a unidirectional conductive circuit for controlling a current direction of an output terminal of the amplifier circuit to limit the base level signal, such that the inductor current threshold is at most zero.

* * * * *